United States Patent
Mekala

(10) Patent No.: US 7,680,105 B2
(45) Date of Patent: Mar. 16, 2010

(54) VOICE OVER INTERNET PROTOCOL (VOIP) SUBCELL MULTIPLEXING

(75) Inventor: Anantha R. Mekala, Leominster, MA (US)

(73) Assignee: Cisco Technology, Inc., San Jose, CA (US)

( * ) Notice: Subject to any disclaimer, the term of this patent is extended or adjusted under 35 U.S.C. 154(b) by 1025 days.

(21) Appl. No.: 11/003,636

(22) Filed: Dec. 3, 2004

(65) Prior Publication Data

US 2006/0120347 A1    Jun. 8, 2006

(51) Int. Cl.
H04L 12/56    (2006.01)
(52) U.S. Cl. ..................................... 370/389
(58) Field of Classification Search ......... 370/352–355, 370/389, 395.1, 395.52, 464, 474, 498, 522; 709/238, 246
See application file for complete search history.

(56) References Cited

U.S. PATENT DOCUMENTS

| | | | | |
|---|---|---|---|---|
| 6,041,054 A * | 3/2000 | Westberg | ..................... | 370/389 |
| 6,366,961 B1 * | 4/2002 | Subbiah et al. | ............. | 709/238 |
| 6,483,842 B1 * | 11/2002 | Mauger | ....................... | 370/420 |
| 6,556,567 B1 * | 4/2003 | Murakami et al. | .......... | 370/394 |
| 6,608,841 B1 * | 8/2003 | Koodli | ....................... | 370/474 |
| 6,717,948 B1 * | 4/2004 | Subbiah | ................. | 370/395.64 |
| 6,829,254 B1 * | 12/2004 | Rajahalme et al. | .......... | 370/535 |
| 6,839,339 B1 * | 1/2005 | Chuah | ......................... | 370/349 |
| 6,873,599 B1 * | 3/2005 | Han | ........................... | 370/249 |
| 7,006,497 B2 * | 2/2006 | Dove et al. | ................... | 370/390 |
| 7,116,683 B1 * | 10/2006 | Petersen et al. | ............. | 370/474 |
| 7,302,497 B2 * | 11/2007 | Vilander et al. | ............. | 709/249 |
| 2003/0026287 A1 | 2/2003 | Mullendore et al. | | |

OTHER PUBLICATIONS

Subbiah, User multiplexing in RTP payload between IP telephony Gateways, IEFT, Internet draft, Aug. 21, 1998.*
Subbiah, RTP payload multiplexing between IP telephony Gateways, Global Telecom Conference, Globecom'99, IEEE, 1999, pp. 1121-1127.*
Schulzrinne, RTP, A transport protocol for real-time application, RFC 1889, Jan. 1996, pp. 1-67.*
Thompson, B., et al., RFC 3336- PPP Over Asynchronous Transfer Mode Adaptation Layer 2 (AAL2) [online], Dec. 2002 [retrieved on Nov. 1, 2004]. Retrieved from http://www.faqs.org/rfcs/rfc3336.html, Dec. 2002.
Noguera, J., et al., ATM Adaptation Layer 2 [online], [retrieved on Nov. 1, 2004]. Retrieved from http://www.computer.org/students/looking/spring1998/noguera/aal2.html.

* cited by examiner

*Primary Examiner*—Dmitry H Levitan
(74) *Attorney, Agent, or Firm*—Hamilton, Brook, Smith & Reynolds, P.C.

(57) ABSTRACT

A communication device such as a Voice over Internet Protocol (VoIP) gateway multiplexes data intended for multiple voice connections within a single IP packet. If it is known in advance that packets for multiple connections between a given Originating Exchange (OEX) and Terminating Exchange (TEX) will travel between the Originating Gateway and Terminating Gateway, voice samples are multiplexed into the same VoIP packet. This "cell multiplexing" is accomplished by adding a cell header field to each cell payload portion. The cell header field indicates at least a connection identifier, so that the terminating gateway can route the payload to the correct TEX trunk. The scheme permits greatly improved efficiency in the carrying of VoIP traffic, especially where efficient voice coders are used.

19 Claims, 4 Drawing Sheets

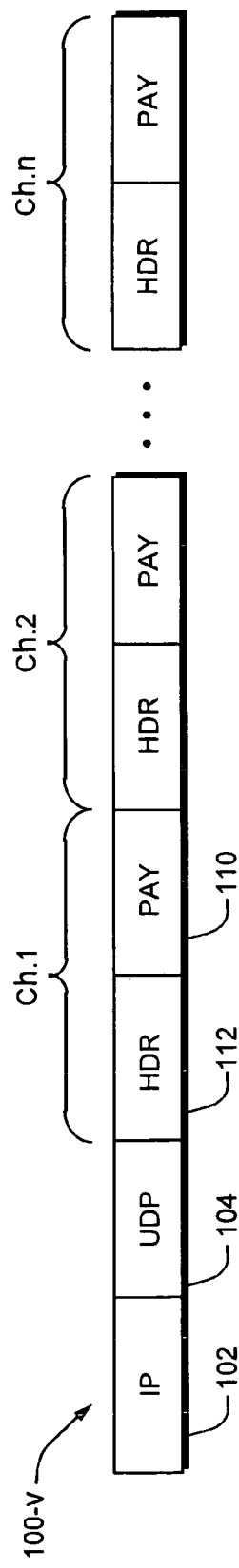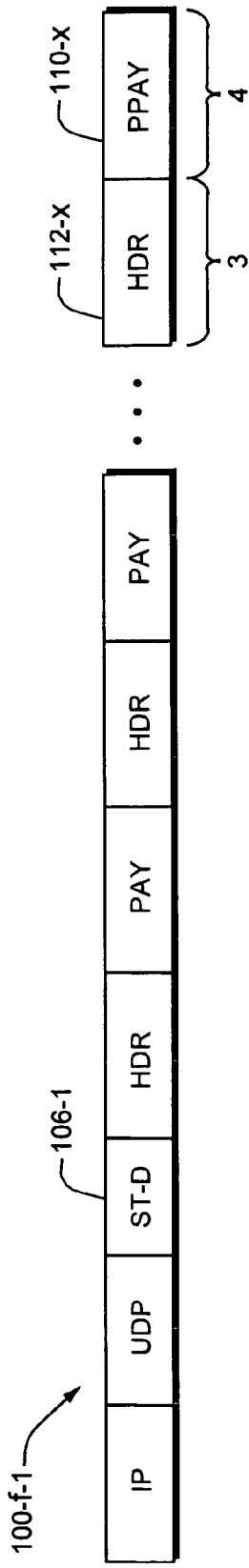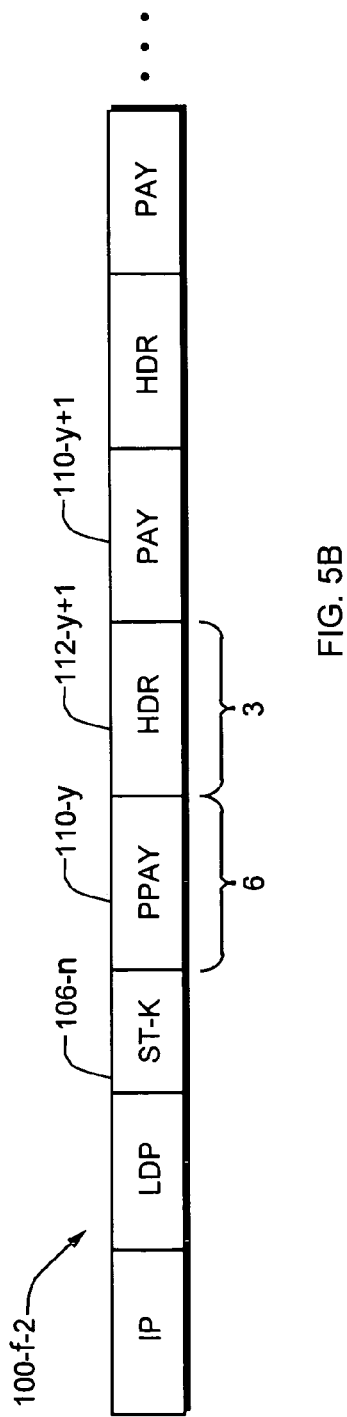

VOICE OVER INTERNET PROTOCOL (VOIP) SUBCELL MULTIPLEXING

BACKGROUND OF THE INVENTION

This invention relates generally to digital telephone networks, and in particular to techniques for transporting voice information over packet networks such as Internet Protocol (IP) networks.

The Internet and other packet switched networks are increasingly used as a transmission medium for voice telephone calls. Internet telephony software and services now provide low cost, or even free, telephone calls anywhere in the world. With simple equipment at the subscriber end, a virtual connection can be established between two callers through a system of interconnected packet based networks that may include the Internet, intranets or other digital networks. These systems are thus emerging as a viable alternative to legacy circuit switch networks.

In order to facilitate communication over the internet, various industry and international standard bodies have established different functional requirements and rules that govern the transmission of data packets that carry voice information. Implementation of these common rules, known as "protocols," is necessary to allow equipment provided by different manufacturers to interoperate.

One typical device within a packet network is called a gateway. Gateways allow dissimilar computer networks that might use different protocols to connect with one another. A gateway provides, in effect, an interface that translates data between the different communication protocols that may be used. One type of gateway is an Internet Protocol (IP) telephony gateway. A typical IP telephony gateway can handle multiple simultaneous telephone calls originating from standard telephone connections within the Public Switched Telephone Network (PSTN) and route them over the internet using the Internet Protocol (IP).

In a typical Voice Over Internet Protocol (VoIP) connection, a caller located at an "originating" point places a telephone call to a terminating point using a standard telephone or computer modem. The call is then routed first to an originating internet telephony gateway, typically through an exchange which is local to the originating point. The originating gateway then establishes one or more IP connections, or "sessions" with a remote "terminating" gateway that services the telephone equipment at the terminating end of the call. The terminating gateway then completes the circuit by connecting to the destination telephone via a local circuit switched connection. The connections are duplexed, i.e., signals flow both from the originating point to the terminating point, and from the terminating point to the originating point.

In order to communicate voice audio signals over a digital network, the gateways modify the audio signals received from and transmitted to the parties' telephones. These audio signals are typically encoded using Pulse Code Modulation (PCM) according to various voice coding standards. At the originating end, equipment is used to sample and encode an analog voice signal. The encoded bits are then arranged into packets for transmission over the IP network that provides the virtual connection. At the terminating end, the terminating gateway disassembles the packets, decodes the sample bits, and converts them back to an analog voice signal once again.

One transport protocol often used for carrying VoIP packets between gateways is the Internet Engineering Task Force (IETF) Real-Time Transport Protocol (RTP), as defined in Request For Comment (RFC) on 1889. RFC 1889 has now been placed into the International Telecommunication Union (ITU) standard H225.0.

While the IP telephony infrastructure has become somewhat popular, users have come to expect to have to tolerate occasional delays and sometimes inferior quality of service. There are a number of factors contributing to this. In a VoIP connection that uses the RTP transport protocol, each end typically encodes the voice samples with a scheme such as used by G.711, G.723 or G.729 type codecs. These codecs are known to be quite efficient. For example, the G.729 codecs can often result in voice payloads of 10 bytes or less, per IP packet, per connection (assuming a 10 millisecond (ms) sampling period).

However, standard VoIP/UDP/RTP packet formats require several headers. These include a 20 byte IP header, an 8 byte User Datagram Protocol (UDP) header, and an 12 byte RTP header. Thus, the typical VoIP packet using the most efficient codecs may have 40 bytes of overhead but only 10 bytes of payload!

It is known that certain transport networks, such as Asynchronous Transfer Mode (ATM) networks, provide subcell multiplexing. In particular, some ATM switches support a so-called ATM Adaptation Layer 2 (AAL2) mode that allows multiple voice channels to be carried over a single ATM virtual circuit. AAL2 requires an additional byte of overhead for each ATM cell and additional 3 bytes of overhead for each voice packet. AAL2 is designed to efficiently handle real-time traffic such as voice. However, conventional wisdom is that other data traffic payloads implemented over AAL2 are sometimes inefficient.

There is a "common part" of AAL2 (AAL2-CP) which has been proposed to adapt the capabilities of ATM to the traffic requirements of low and variable bit rate applications. AAL2-CP thus suggests multiplexing several low bandwidth AAL2 connections into a single ATM virtual channel connection.

Some have proposed a scheme known as Compressed Real Time Transport Protocol (CRTP) which allows the compression of headers within a single VoIP packet. This scheme uses a CRTP header with length of 4 bytes for each payload. Special purpose state update headers permit the end-to-end connections to be properly maintained.

However, this approach requires routers to support PPP or any other data link layer protocols to handle the CRTP packets. This can pose a difficulty when VoIP traffic is to be carried over public networks such as the Internet, and where the configuration of intervening routers cannot be known in advance.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is a still further view of the packet formats used when IP packet lengths are variable.

FIGS. 5A and 5B are diagrams of fixed length IP packets.

DETAILED DESCRIPTION OF THE INVENTION

A description of preferred embodiments of the invention follows.

The present invention may be implemented as part of a voice communication system that uses a packet switched network. In particular the invention is advantageous when the network is an Internet Protocol (IP) network. As is well known in the art, such networks may use certain communication devices known as gateways that convert audio signals originating from telephone equipment, or other audio signal sources, to digital data in a packet format. This permits telephone signals to be carried as digital data over such networks.

If it is known in advance that multiple Voice over Internet Protocol (VoIP) connections are desired between a given Originating Exchange (OEX) and a given Terminating Exchange (TEX), and, therefore, that VoIP packets for multiple connections will travel between the same Originating Gateway (OGW) and Terminating Gateway (TGW), the payload portion of such packets can be multiplexed into single IP packets. In other words, VoIP payloads can be multiplexed such that multiple voice payloads are carried in each IP packet.

Subcell multiplexing can be provided by adding a header field to each payload. The header field indicates a destination time slot at the terminating gateway. This allows the TGW to route the various payload pieces to their proper destinations, such as the equipment at the terminating end. This scheme thus permits a single IP packet to carry multiple payloads, greatly increasing the efficiency of VoIP.

Figure 1:
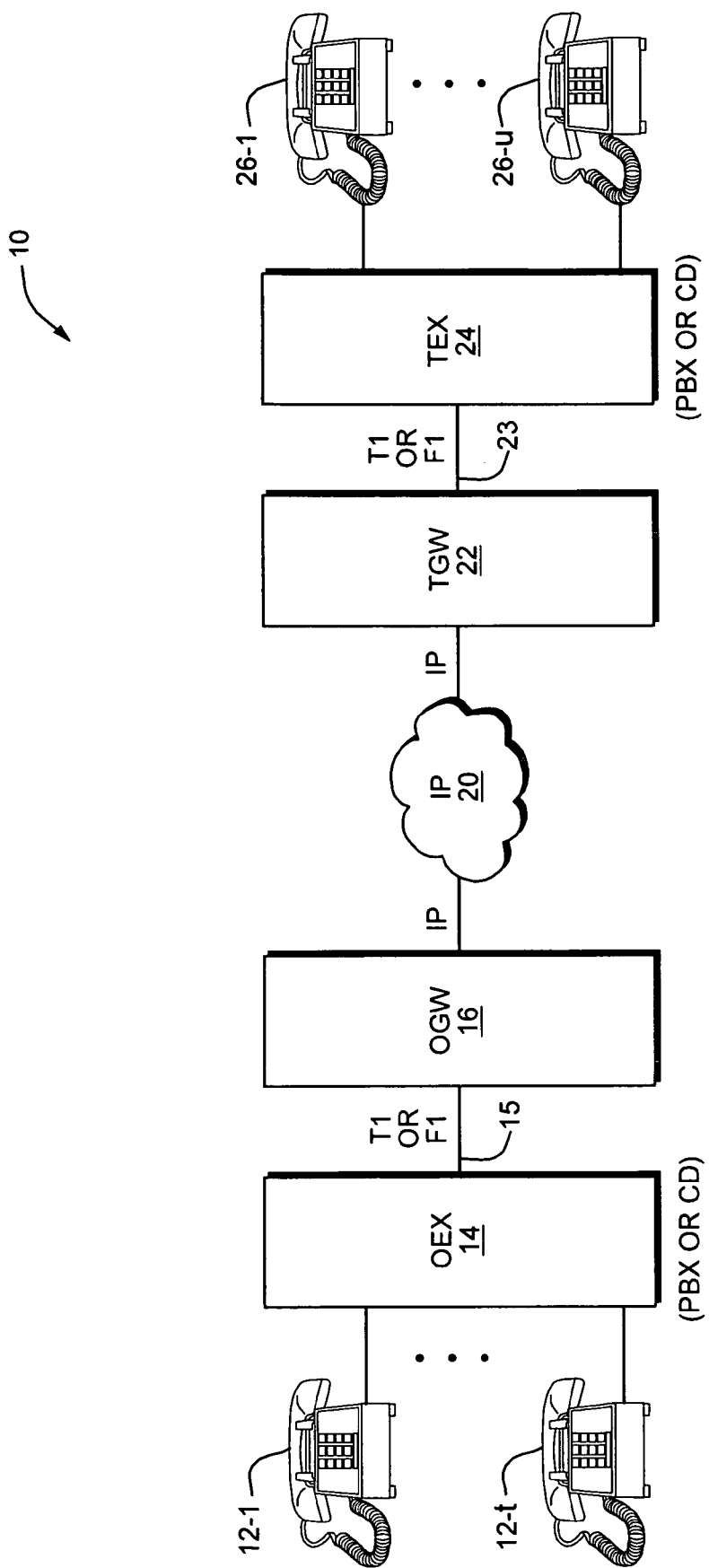
FIG. 1 is a block diagram of a Internet Protocol (IP) based telephony system in which the present invention may be used.

Now more particularly, FIG. 1 is a block diagram of one possible system 10 in which the invention may be used. The system 10 consists of a first set of telecommunication user devices 12-1, . . . 12-t connected via an Originating Exchange (OEX) 14 to an originating gateway 16 (OGW). The OGW 16 is, in turn, connected to a packet network such as one which preferably uses the Internet Protocol (IP). The OEX 14 may be the Public Switched Telephone Network (PSTN), a Private Branch Exchange (PBX), or some other telephone network. The OGW 16 will be described in greater detail in connection with FIG. 2 below.

A second gateway, referred to herein as the Terminating Gateway (TGW) 22, communicates via a Terminating Exchange (TEX), through a PSTN or PBX with other telecommunication user devices 26-1, . . . 26-u at a terminating point(s). The user devices 12, 26 may include any device capable of communicating over telephony networks. These may include standard telephones, modems, Digital Subscriber Line (DSL), Integrated Services Digital Network (ISDN), or equipment that provides services such as integrated voice response, voice mail, banking services or other equipment.

The originating exchange 14 and terminating exchange 24 are, in one embodiment, the local Central Office exchanges to which the telecommunication devices 12 and 26, respectively, connect.

The gateways 16, 22 are connected to each other via network 20 which may be the Internet infrastructure capable of supporting User Datagram Protocol/Internet Protocol (IP/UDP) transport/networking protocols. Alternatively, other computer networks such as one or more private IP networks, wide area networks, or local area network configurations may comprise all or part of network 20.

Although it is not shown in FIG. 1 it is understood that functions such as gatekeepers (not shown) operating in connection with H.323 protocol or similar devices are used to manage gateway access to the switched networks and the routing of connections between the OGW 16 and TGW 22.

To place a call, the user of telephone equipment 12 at the originating point dials a number. A connection is then made from user equipment 12 to the OEX 14. OEX 14 then forwards the call to gateway 16 using standardized signaling. The connections are made, for example, by the OEX 14 providing the originating and terminating telephone numbers to the gatekeeper servicing the OGW 16. Traffic will then flow between OEX and OGW 16 via the channelized T1 connection(s) 15 between them. To set up the IP connection, the OGW 16 queries an available database (not shown) to obtain the transport address of the TGW 22 that is connected to the TEX 24 that services the terminating equipment 26 to which the user would like to connect. All this occurs in a manner which is well known in the art, such as via H.323 or Q.931 protocols for setting up calls between gateways 16, 22. Other methods are also possible, such as by using "switch independent" gateways that are known in the art.

Once a connection is made, an audio signal carrying the user's voice (and any modem tones, for example) are carried in full duplex between the gateways 16, 22 as packet data over the IP network 20.

The process continues at the TGW 22, that is, voice packets are received and then recombined prior to being fed to the TEX 24, which then connects them as switched signals over a T1 line to the terminating user equipment 26.

The connections are full duplex, so that signals also travel from the terminating equipment 26, through TEX 24, TGW 22, over IP network 20 and the OGW 16, where they are depacketized and forwarded to the OEX 14. From there, signals are fed to one of the user devices 12.

While the connection set up between the OGW 16 and TGW 22 described above uses switching, it should be understood that connections can be made using a trunking through IP network 20.

The present invention seeks to alleviate a difficulty with prior art VoIP systems. In particular, voice coder/decoders (codecs) are used in the gateways 16 and 22 to digitize analog voice signals have become quite efficient. Some codecs, for example, the G.729 type, may only require approximately 10 bytes of data per IP packet, per connection (assuming a 10 ms sampling rate). A standard IP packet, using the Real-Time Transport Protocol (RTP), may have as many as 40 or more bytes of overhead to carry the 10 bytes of payload data. This would include at least 20 bytes of IP header, 8 bytes of UDP header, and 12 bytes of RTP header. Thus, straight IP/UDP/RTP packet formatting carries with it inefficiencies, in that the overhead is sometimes four times larger than the payload!

The present invention seeks to alleviate this difficulty by using specialized packet formats, which eliminate the need for RTP headers and which permit packaging voice signals for multiple connections in each IP packet. This feature is implemented in OGW 16 and TGW 22 in the elements that packetize and depacketize signals, so that the other equipment (OEX 14, TEX 24, etc.) need not be modified.

Figure 2:
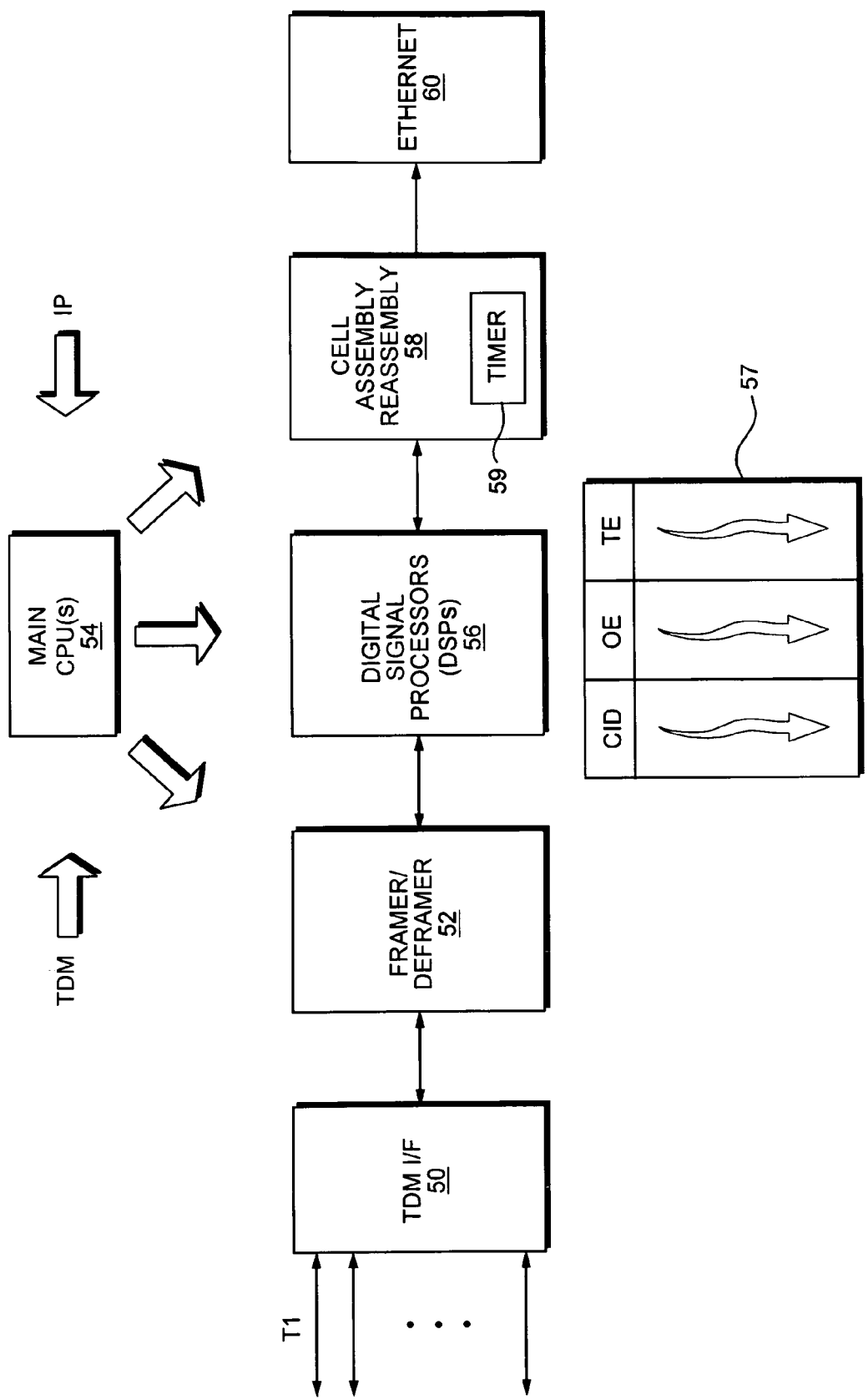
FIG. 2 is a more detailed view of a packet processing portion of an Originating Gateway (OGW).

Turning attention to FIG. 2, there is shown more detail of an OGW 16 (the TGW is similar) which includes a T1 interface 50, a framer/deframer 52, main Central Processing Unit(s) (CPUs) 54, Digital Signal Processor (DSPS) 56, cell assembly/reassembly function 58 and Ethernet interface 60. A gateway is partly divided into a switched network side and an IP network side. The switched network interface for example accepts one or more T1 type connections providing signals as T1 frames.

In a direction flow from left to right in FIG. 2, received T1 data is deframed by the deframing function 52 and then provides individual time slots to one or more of the DSPs 56. The DSPs 56 then further strip off any required formatting, performing necessary functions such as determining how to assemble frames into IP packets, and applying voice coding as needed. The IP packets are then assembled by cell assembly 58 function and forwarded to the IP network through for example, an Ethernet type interface 60. (It should be understood that other physical/data link layers apart from Ethernet can be used here as well.)

The main CPUs 54 may perform control tasks such as configuration, call set up and tear down, and other management functions. Other CPUs 54 may handle data moving and other system functions.

It should be understood that the reverse process occurs in connection with packets being received on the IP side and forwarded to become frames on the T1 side. Thus, for data flow in the direction from right to left in FIG. 2, IP packets are received at Ethernet interface 60, and then disassembled by cell disassembly function 58. They are then forwarded to the DSPs 56, to decode them. The framer 52 then formats the payload information into suitable frames for forwarding to the T1 connection.

Figure 3:
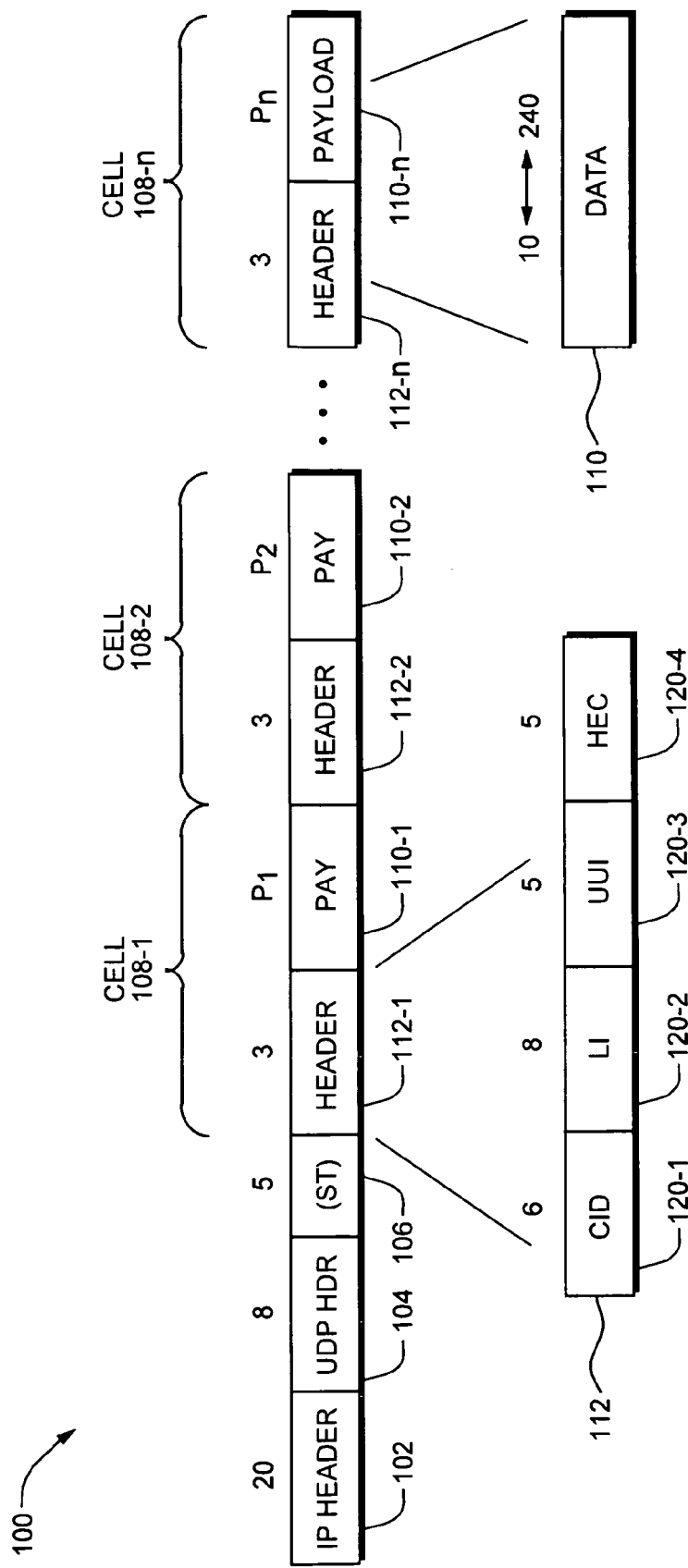
FIG. 3 is a more detailed view of how packets may be formatted according to the invention.

Now with attention to FIG. 3, the preferred format of packets traveling over the IP side, that is, the format of packets formed by assembler 58 will be discussed. In this preferred format, multiple VoIP payloads are packaged into a single IP/UDP packet 100. The VoIP packet 100 has several fields, among them at least an IP header 102 and UDP header 104. These headers 102, 104 are used to route the packet between the OGW 16 and TGW 22 by intermediate router(s).

An optional start field 106 may also be present—the function of this field will become evident in the following discussion.

Next, multiple cells 108 each consist of cell payloads 110-1, 110-2, . . . 110-n and cell headers 112-1, 112-2, 112-n. The cell payloads 110 may take various forms. In some embodiments of the invention, for example, the cell payloads may be of a fixed size, i.e., 10 bytes. However, there are implementations of the invention where sizes of the cell payloads may vary from 10 bytes up to about 240 bytes each. The size of each payload depends on the codecs used, the packetization period, and other factors. For example, a G.711 codec may optionally use cell payload sizes of 240 bytes with a 40 ms packetization period. However, more efficient codecs such as G.729 may only require 10 ms packetization and 10 byte payloads per cell.

In a preferred embodiment, the header portion 112 of each cell 108 may be three bytes long. The primary function of the cell header 112 is to identify the connection to which each payload belongs. That is, for example, one of the connections between time slots on links 15 and 23 must be identified with cell payload 110-1. This would be indicated by the contents of cell header 112-1 in the connection ID (CID) field 120-1. These equipment identifiers may be any suitable ID, such as a T1 trunk number on which they connect to the corresponding gateway. The DSPs 56 and/or CPUs 54 maintain a table 57 (FIG. 2) indicating correspondence between CIDs and identification for time slots on links 15, 23.

The size of the CID field thus depends on the desired number of cell payloads to be carried in each IP/UDP packet 100. In a preferred embodiment, the CID field 120-1 is 6 bits long, permitting up to $2^6$ or 64 connections. Thus, up to two T1 lines 15 (each carrying 24 traffic channels) or two E1 lines (each carrying 30 traffic channels) can be supported per IP/UDP connection. This is different from the standard CID field size specified by the AAL2 standard, which has other considerations.

It should be understood that the system can be configured to assign a given UDP address to each stream of multiplexed connections in a quite flexible manner. For example, if full T1 connectivity is available at the TDM sides of both the OGW 16 and TGW 22, then 24 cells can be included in each packet. However, if greater or lesser service is provisioned (e.g., multiple T1's or fractional T1's), then the number of cells per packet is selected accordingly.

Each cell header 112 may include other information. For example, a Length Indicator (LI) 120-2 is always used since the cells may be of different sizes. The LI field 120-2 permits the deassembler to separate the cells within a given IP/UDP packet 100 in the TGW 22.

In a preferred embodiment, the LI field 120-2 is eight bits long, permitting up to 256 bytes of payload in each cell, which is also somewhat different from the standard AAL2 header format. For G.711 codecs, AAL2 only supports a packetization period of 5 milliseconds (ms) or less, meaning that no more than 64 bytes can fit into a standard ATM cell. Thus, a longer LI field of 8 bits can support all types of payloads used in present VoIP networks.

The combination of a 6 bit CID and 8 bit LI fields keeps the total length of cell header 112 the same as for AAL2, but better adapted for carrying VoIP payloads.

A User to User Information (UUI) field 120-3 functions to forward information to upper protocol layers. This information could include sequence numbers, codec identifiers, or the like. In the preferred arrangement, the UUI field identifies cell payload types according to the AAL2/I.366.2 standard. In this manner, different types of cell payloads (i.e. voice, Dual Tone Multi-Frequency (DTMF), alarms, CAS) can be carried in the same IP/UDP packet 100.

Finally, a Header Error Correction (HEC) field 120-4 may carry error correction information such as a Cyclic Redundancy Check (CRC) field that allows for error correction within each cell header 112. The HEC field 120-4 is also coded according to the AAL2/I.366.2 standard in the preferred embodiment.

FIG. 4 shows more detail of the preferred format of a IP/UDP packet when variable IP packet sizes are used. In particular, given that the length of an IP packet can vary, the start field 106 need not be provided. Thus, packet 100-v consists merely of the IP header 102, UDP header 104, and individual cell headers 112 and cell payloads 110 associated with the various connections being serviced. In this embodiment, cell payloads are not permitted to cross IP packet 100-v boundaries. In other words, each cell payload is wholly contained. In a given IP packet 100-v when the packet assembler 58 is building packets and runs out of space in a present IP packet, it simply starts assembling a new packet 100-v+1.

It had been mentioned previously that there is not necessarily a one to one correspondence between the number of cells 108 in each packet 100 and the number of active connections between OGW 16 and TGW 22. This is a quite practical consideration in most systems. In particular, it is quite common occurrence for not allconnections to actively be sending data at a given instant in time. Thus, cell assembly block 58 can typically include cells in packets 100 only those connections that are active.

There then becomes a dilemma as to when to consider an IP/UDP packet is ready to send. It is doubtful that it would be optimum to always try to completely fill each packet 100 to its maximum length. Such a scenario would introduce intolerable delays for one connection caused by sporadic activity in other connections. A better approach is to use a timer 59 in the packet assembler 58. The timer 59 may be set to a value anywhere from about 0 ms to 100 ms depending on operating conditions. When the timer period expires, a packet 100 in the process of being assembled is then considered complete, and is sent, regardless of whether or not all of the possible cells are full. Alternatively, once a packet is full it is of course sent immediately, regardless of whether the timer period has expired. Such a timer 59 ensures that no unreasonable delay is introduced to any connection exceeding a predetermined amount, which amount is of course dictated by the timer 59 setting.

FIG. 5A and 5B show an alternate embodiment of the invention which supports fixed length IP packets 100-f-1 and 100-f-2. In this instance, a start field 106 is included. The content of the start field 106 may be set to a known value such as a zero value in a case of the packet 100-f-1 shown in FIG. 5A. The zero value is used as an indication that the packet 100-f-1 is the first of a series of IP packets that are to be disassembled together. A subsequent follow on packet, such as packet **100-*f*-2, then has its start field 106-2 set to a value k. The k value indicates a next complete cell 106-*n* within the packet 100-*f*-2**.

In one example scenario, the final portion of packet **100-*f*-1 may have only have enough room in it (within its fixed packet length) to handle the first 4 bytes of a particular cell payload 110-*x* which is 10 bytes long. The remaining 6 bytes of the 10 byte cell are then carried in a field 110-*y* in the following packet 100-*f*-2. The offset field 106-*n* thus indicates a value k of 6. This lets the TGW 22 know that first 6 bytes in packet 100-*f*-2 are to be interpreted as payload for the last cell associated with the header 112-*x* in the immediately previous IP packet 110-*f*-1. In this way, fixed length IP packets 100-*f*** can be used to accommodate variable length payloads associated with individual connections and/or groups of connections.

The relative improvement in efficiency possible with the invention can now be understood. Consider first a typical scenario where one might have multiplexed VoIP payloads from multiple connections in a single IP/UDP packet using RTP. Assuming a payload size of 10 bytes per cell, a typical packet might look like this (field sizes are indicated under each field identifier):

| IP | + | UDP1 | + | RTP1 | + | PL1 | + | UDP2 | + | RTP2 | + | PL2 | +...+ | UDPn | + | RTPn | + | PLn |
|----|---|------|---|------|---|-----|---|------|---|------|---|-----|-------|------|---|------|---|-----|
| 20 | + | 8    | + | 12   | + | 10  | + | 8    | + | 12   | + | 10  | +...+ | 8    | + | 12   | + | 10  |

(where UDPn indicates the UDP header, RTPn the RTP header, and PLn indicates the payload for connection "n"). Thus each connection requires 20 bytes of overhead (the 8 byte UDP header and the 12 byte RTP header) per 10 bytes of payload. For a system supporting the multiplexing of 10 connections, the total length of a packet is thus 20+(20+10)*10=320 bytes.

However, with cell packetization according to tthe invention, each IP/UDP packet has the following format:

| IP | + | UDP | + | start | + | CHR1 | + | PL1 | + | CHR2 | + | PL2 | +...+ | CHRn | + | PLn |
|----|---|-----|---|-------|---|------|---|-----|---|------|---|-----|-------|------|---|-----|
| 20 | + | 8   | + | 1     | + | 3    | + | 10  | + | 3    | + | 10  | +...+ | 3    | + | 10  |

(where CHRn indicates the cell header for cell "n") so that to support 10 connections at 10 bytes per payload is only 20+8+1+(10+3)*10=29+130=159 bytes for an improvement of 100%.

Efficiency actually improves with increasing numbers of multiplexed connections. In a scenario where an entire T1 line (24 connections) is to be multiplexed into a single IP/UDP packet, the prior art approach would require a packet size of 20+(20+10)*24=740 bytes whereas the invention requires only 20+8+1+(10+3)*24=341 bytes an almost 117% improvement in efficiency.

While this invention has been particularly shown and described with references to preferred embodiments thereof, it will be understood by those skilled in the art that various changes in form and details may be made therein without departing from the scope of the invention encompassed by the appended claims.

What is claimed is:

1. A network device comprising:
   an interface for receiving a telephony signal from an originating exchange, the telephony signal containing a voice signal component representing voice signals;
   an interface for receiving an indication that a Voice over Internet Protocol (VoIP) connection is to be made to a corresponding network device servicing a terminating exchange;
   a cell formatter for formatting a cell to comprise:
   a) a VoIP data payload that includes the voice signal component, and
   b) a 3-byte cell header comprising:
   a 6-bit connection identifier that identifies a trunk on which the telephony signal was received,
   an 8-bit length identifier that indicates a length of the data payload,
   a 5-bit user information field that identifies a data type for the data payload, and
   a 5-bit error correction field; and
   a packet formatter, for combining cells thus encoded for multiple connections intended between the same originating and terminating exchanges into a packet, the packet formatted thereby being a single Internet Protocol (IP) packet such that a payload portion of the single IP packet comprises multiple cells intended for different connections.

2. An apparatus as in claim 1 wherein transport protocol information is also included in the IP packet as User Datagram Protocol (UDP) information.

3. An apparatus as in claim 1 wherein the IP packet includes a start field indicating an offset used to identify a beginning location of a first cell header in the IP packet.

4. An apparatus as in claim 3 wherein the start field is used to delineate a portion of the cell that relates to a cell in a previous IP packet in a packet sequence.

5. An apparatus as in claim 1 wherein each cell contains a user information field that identifies a data type for the corresponding payload portion.

6. A network device comprising:
   means for receiving, from an originating exchange in a network, a telephony signal containing a voice signal component representing voice signal;

means for receiving an indication that a connection is to be made to a corresponding network device servicing a terminating exchange;
means for formatting a cell to comprise:
   a) a data payload that includes the voice signal component, and
   b) a 3-byte cell header comprising:
      a 6-bit connection identifier that identifies a trunk on which the telephony signal was received,
      an 8-bit length identifier that indicates a length of the data payload,
      a 5-bit user information field that identifies a data type for the data payload, and
      a 5-bit error correction field; and
means for combining cells thus encoded for multiple connections intended between the same originating and terminating exchange into a single Internet Protocol (IP) packet such that a payload portion of the single IP packet comprises multiple cells intended for different connections.

7. A computer program product for operating a network device connected to receive and transmit signals from and to both a circuit switched network and a packet switched network, the computer program product comprising a computer usable medium having computer readable code embodied therein, the computer readable code comprising instructions to be executed by one or more processors comprising the steps of:
   receiving, from an originating exchange in the circuit switch network, a telephony signal containing a voice signal component representing voice signals;
   receiving an indication that a Voice over Internet Protocol (VoIP) connection is to be made to a corresponding network device servicing a terminating exchange;
   formatting a cell to comprise:
      a) a VoIP data payload that represents the voice signal component, and
      b) a 3-byte cell header comprising:
         a 6-bit connection identifier that identifies a trunk on which the telephony signal was received,
         an 8-bit length identifier that indicates a length of the data payload,
         a 5-bit user information field that identifies a data type for the data payload, and
         a 5-bit error correction field; and
   combining cells thus encoded for multiple connections intended between the same originating and terminating exchanges into a single internet protocol (IP) packet, such that a payload portion of the single IP packet contains multiple cells intended for different connections.

8. A method of operating a network device connected to receive and transmit voice signals from and to a circuit switched network and a packet network, the method comprising:
   receiving, from the packet network, an Internet Protocol (IP) packet that comprises a payload portion containing multiple cells encoded for multiple Voice over Internet Protocol (VoIP) connections between a given originating exchange and a given terminating exchange, each cell comprising:
      a) a VoIP data payload that includes a voice signal component, and
      b) a 3-byte cell header comprising:
         a 6-bit connection identifier that identifies a trunk on which a telephony signal represented by the voice signal component was received,
         an 8-bit length identifier that indicates a length of the data payload,
         a 5-bit user information field that identifies a data type for the data payload, and
         a 5-bit error correction field;
   separating the multiple cells from the IP packet;
   converting a selected one of the cells to a telephone signal containing at least one voice signal; and
   forwarding the at least one voice signal to the given terminating exchange in the circuit switched network.

9. A method as in claim 8 wherein transport protocol information is also included in the IP packet as User Datagram Protocol (UDP) information.

10. A method as in claim 8 wherein the IP packet includes a start field indicating an offset used to identify a beginning location of a first cell header in the IP packet.

11. A method as in claim 10 wherein the start field is used to delineate a portion of a cell to be appended to a cell in a previous IP packet in a sequence.

12. A method as in claim 8 wherein the length identifier is determined based on a packetization period for voice to data conversion.

13. A method as in claim 8 wherein the length identifier is determined based on parameters of a voice codec used for converting the voice signal to data.

14. A method of operating a network device connected to receive and transmit voice signals from and to both a circuit switched network and a packet network, the method comprising the steps of:
   receiving, from an originating exchange in the circuit switched network, a telephony signal containing a voice signal component representing at least one voice signal;
   receiving an indication that a Voice over Internet Protocol (VoIP) connection is to be made to a corresponding network device servicing a terminating exchange;
   formatting a cell to comprise:
      a) a VoIP data payload that includes the voice signal component and a connection identifier, and
      b) a 3-byte cell header comprising:
         a 6-bit connection identifier that identifies a trunk on which the telephony signal was received,
         an 8-bit length identifier that indicates a length of the data payload,
         a 5-bit user information field that identifies a data type for the data payload, and
         a 5-bit error correction field; and
   combining cells thus encoded for multiple VoIP connections intended between the same originating and terminating exchanges into a single Internet Protocol (IP) packet, such that a payload portion of the single IP packet comprises multiple cells intended for different VoIP connections.

15. A method as in claim 14 wherein transport protocol information is also included in the IP packet as User Datagram Protocol (UDP) information.

16. A method as in claim 14 wherein the IP packet includes a start field indicating an offset used to identify a beginning location of a first cell header in the IP packet.

17. A method in claim 16 wherein the start field is used to delineate a portion of a cell to be appended to a cell in a previous IP packet in a sequence.

18. A method as in claim 14 wherein the length identifier is determined based on a packetization period for voice to data conversion.

19. A method as in claim 14 wherein the length identifier is determined based on parameters of a voice codec used for converting the voice signal to data.

* * * * *